US009247692B2

(12) United States Patent
Hatcher (10) Patent No.: US 9,247,692 B2
(45) Date of Patent: Feb. 2, 2016

(54) UNIVERSAL DRAIN HOLE COVER FOR PLANTING CONTAINERS (71) Applicant: Pamela S. Hatcher, Plano, TX (US)

(72) Inventor: Pamela S. Hatcher, Plano, TX (US)

(*) Notice: Subject to any disclaimer, the term of this patent is extended or adjusted under 35 U.S.C. 154(b) by 301 days.

(21) Appl. No.: 13/655,243

(22) Filed: Oct. 18, 2012

(65) Prior Publication Data

US 2013/0276369 A1  Oct. 24, 2013

Related U.S. Application Data (60) Provisional application No. 61/628,037, filed on Oct. 24, 2011.

(51) Int. Cl.
A01G 9/02 (2006.01)
(52) U.S. Cl.
CPC .......................................... *A01G 9/02* (2013.01)
(58) Field of Classification Search
CPC ........... A01G 9/02; A01G 9/021; A01G 9/04; A01G 27/00; A01G 27/008
USPC ............. 47/65.6, 66.7, 66.6, 71, 48.5, 75, 80, 47/79, 65.5
See application file for complete search history.

(56) References Cited

U.S. PATENT DOCUMENTS

| 611,523 A | 9/1898 | Springer |
|---|---|---|
| 1,453,216 A | 4/1923 | Weidig |
| 1,789,994 A | 6/1929 | Wittbold |
| 1,869,606 A | 8/1932 | Mennell |
| 1,884,204 A | 10/1932 | Pilkington |
| 1,996,898 A | 4/1935 | Brandell |
| 2,026,679 A | 1/1936 | Higgins |
| 2,120,599 A | 6/1938 | Brown |
| 3,675,368 A | 7/1972 | Nustad |
| 3,866,352 A | 2/1975 | Herveling et al. |
| 3,935,672 A | 2/1976 | Chatelain |
| 3,958,365 A | 5/1976 | Proctor |
| 4,138,803 A | 2/1979 | Sherlock |
| 4,166,340 A | 9/1979 | Pluenneke |
| 4,329,814 A * | 5/1982 | Blicha ............................... 47/79 |
| 4,356,665 A | 11/1982 | de Oliviera |
| 4,571,883 A | 2/1986 | Shaw |
| 4,593,490 A | 6/1986 | Bodine |
| 4,644,686 A | 2/1987 | Whitman |
| 4,860,491 A | 8/1989 | Panuski |
| 4,991,345 A | 2/1991 | Bloch |

(Continued)

OTHER PUBLICATIONS

Aqua Flower, Mar. 18, 2013, 1 page, published by Plastec Products; website located at: http://www.plastecproducts.com/product.php?cat=3&id=0; This is a drainage hole cover made out of recycled products adapted to be placed over a drainage hole of a plantar.

*Primary Examiner* — Trinh Nguyen
(74) *Attorney, Agent, or Firm* — Leyendecker & Lemire, LLC (57) ABSTRACT

An improved drain hole cover for use in all types of planting containers is described. A preferred embodiment of the drain hole cover comprises a single generally discoid layer of lofted synthetic nonwoven material with a pressure-sensitive adhesive applied to one side. Generally, the adhesive can be applied to a periphery of the one side of the drain hole cover in a pattern so as to leave a central portion uncoated by the adhesive. The drain hole cover can be disposed, adhesive side down, on an inner surface of a planting container concentric to a drainage hole of the planting container. In use, the drain hole cover allows water to drain out of the container and prevents the egress of soil through the drainage hole.

19 Claims, 9 Drawing Sheets

(56) References Cited

U.S. PATENT DOCUMENTS

| | | |
|---|---|---|
| 5,181,951 A | 1/1993 | Cosse, Jr. |
| 5,446,995 A | 9/1995 | Huber |
| 5,448,854 A | 9/1995 | Hirsch et al. |
| 6,125,579 A | 10/2000 | Pavelka |
| 6,138,411 A | 10/2000 | Lin |
| 6,289,632 B1 | 9/2001 | Boling |
| 6,318,022 B1 | 11/2001 | Just |
| 6,594,953 B2 * | 7/2003 | Weder et al. .............. 47/75 |
| 6,606,821 B1 | 8/2003 | Connelly |
| 7,743,554 B2 | 6/2010 | Morris |
| 7,877,930 B2 | 2/2011 | Burge |
| 2005/0060933 A1 | 3/2005 | Henson |

\* cited by examiner

UNIVERSAL DRAIN HOLE COVER FOR PLANTING CONTAINERS

CROSS-REFERENCE TO RELATED APPLICATION

This application claims the benefit of U.S. Provisional Application No. 61/628,037, filed 24 Oct. 2011.

FIELD OF THE INVENTION

The present invention relates to drain hole coverings for planting containers, specifically coverings which allow for the unrestricted passage of water while preventing the egress of soil through the drain hole.

BACKGROUND

Gardeners have long been challenged to find an effective covering for the drain holes in planting containers. The drain hole must remain open to allow for the free passage of water out of the container. At the same time, the hole must also be covered in some way to prevent the egress of soil or planting medium.

The longstanding traditional answer to this problem has been to cover the drain hole with bits of gravel or broken pieces of old clay pots. However, these broken clay shards are becoming less available with increased use of planting containers made of plastic and synthetic materials. In addition, many urban and small-scale hobby gardeners in particular now find that they have neither the space nor lifestyle to maintain a stockpile of old broken pots or gravel solely for this limited purpose. Despite the shortcomings and decreasing availability of these materials, they are still the drain hole coverings widely recommended by expert gardeners, and virtually every book, magazine, and Internet website addressing the subject to date.

Such popular recommendations also often include the addition of a layer of gravel to the bottom of the pot, assuming that the unobstructed pathways of larger pore spaces will speed evacuation of water from the pot. However, observable soil mechanics and fluid dynamics argue against this practice. Modern agricultural and horticultural science has proven and teaches that water will not pass gravitationally from a finely textured soil mass into a markedly coarser underlying layer until the interface portion of the upper finer layer is fully saturated. The coarser the underlying material, the more difficult it is for water to move across the upper interface. Therefore, contrary to conventional wisdom, the addition of a coarse bottom layer actually impedes planting container drainage rather than promoting drainage.

The growing trend from clay pots to plastic and synthetic ones creates other challenges to gardeners. This change in materials technology greatly expands the possible profiles of planting containers, and the placement and number of their drain holes. Especially problematic are drain holes placed at the angle formed by a container's bottom and its vertical side wall.

Watering plants normally from the top erodes soil through the drain hole, but bottom watering and drenching do so even more. These two common horticultural practices involve placing filled planting containers directly in larger containers of water, for purposes of insect control or remoistening of overdried soil, and can erode the planting medium considerably over the life of the planting.

Bonsai gardeners have dealt with the problem of drain hole coverage by using small pieces of metal window screen, or similar material made of plastic. However, this improvisation is only effective with the very coarse soils used in this specialized field of horticulture.

The patent record describes a number of planting containers with a variety of configurations and compositions with no provision for the covering of their drain holes or channels. The following are offered as examples:

U.S. Pat. No. 4,329,814 issued to Blicha on 18 May 1982;
U.S. Pat. No. 4,356,665 issued to de Oliviera on 2 Nov. 1982;
U.S. Pat. No. 4,593,490 issued to Bodine on 10 Jun. 1986;
U.S. Pat. No. 4,644,686 issued to Whitman on 24 Feb. 1987;
U.S. Pat. No. 4,991,345 issued to Bloch on 12 Feb. 1991;
U.S. Pat. No. 5,446,995 issued to Huber on 5 Sep. 1995;
U.S. Pat. No. 6,138,411 issued to Lin on 31 Oct. 2000; and
U.S. Pat. No. 6,289,632 issued to Boling on 18 Sep. 2001.

Bodine does consider the issue of soil loss through the drainage openings of his patented container. However, instead of a drain hole cover, Bodine specifies erosion baffles to impede the flow of water along the container's bottom and thereby control fine soil erosion to a limited extent.

Before beginning the planting process and enjoying any advantages offered by even the most improved containers, the individual gardener is thus required to solve the drain hole cover problem on his or her own. The following patents have attempted to address that problem.

An early invention, U.S. Pat. No. 611,523 issued to Springer on 27 Sep. 1898, teaches an imperforate disk or plate with a convex upper side and a series of radial grooves on its lower side, which converge into a depending stud which is to be inserted into the drain hole. Its rigid construction and direct fluid communication would not completely retain soil, and would not be effective for a drain hole located in an angular or concave area of a container.

Weidig's U.S. Pat. No. 1,453,216 issued on 24 Apr. 1923 calls for the insertion of a wire mesh baffle into the drain hole of a concrete planting container during the molding process. This device is clearly of limited use, being incorporated into the particular container under patent.

Wittbold includes a fragile paper drain hole cover in his U.S. Pat. No. 1,789,994 issued on 17 Jun. 1929 for a commercial plant transport container which can be later adapted as a permanent planting container by the customer upon purchase. At such time, the paper is intended to be manually ruptured, or degenerated by means of water contact. Once the paper seal is broken, no other means is provided for securing the soil within the drain hole.

The device of U.S. Pat. No. 1,869,606 issued to Mennell on 2 Aug. 1932 is a cap or disk molded integrally with a pot and centered over its drain hole. Water exits the pot through slots occurring at its angle of attachment. Its use is clearly limited to the specified container of the patent.

U.S. Pat. No. 1,884,204 issued to Pilkington on 25 Oct. 1932 teaches a drain hole cover of any number of intersecting and integrally formed curved resilient arms attached to one flat end of a small cylindrical member, the opposing flat end of which fits into the pot's drain hole. Its stated objective is to retard flow of water before allowing it to exit the container. This device is only useful in non-angular applications.

U.S. Pat. No. 2,026,679 issued to Higgins on 7 Jan. 1936 is for a drain hole cover of a vertical truncated cone shape with an open bottom end, and with a plurality of notches radially formed in its lower edge. Its open bottom and notched bottom edge rest on the container's interior bottom and fully cover its drain hole. This device is limited to use in flat-bottomed containers, and allows direct fluid communication.

U.S. Pat. No. 2,120,599 issued to Brown on 14 Jun. 1938 sets forth a vertical finned spindle joined to the center of a shallow receptacle by means of a threaded shaft. The spindle stabilizes the filled planting container in an upright position, while the vertical fins direct the outflow of water. This assembly is useful only with containers having a centered drain hole, and its complexity increases its cost.

U.S. Pat. No. 3,935,672 issued to Chatelain on 3 Feb. 1976 describes an upright, generally cylindrical structure which is placed over a planting container's drain hole, allowing drainage to occur only when the water level reaches the upper, open end of the cylinder. Consequently, there would remain in the bottom of the pot a stagnating, perpetually undrained volume of water equal in depth to the height of the cylinder. This invention encourages incomplete drainage and an overly wet environment, widely known to be detrimental to plants in containers.

U.S. Pat. No. 4,138,803 issued to Sherlock on 13 Feb. 1979 describes a container employing a completely obstructive drain plug. A perforated plate rests horizontally inside the container and somewhat above the obstructed drain hole. This allows a small volume of water to collect beneath the plate, providing beneficial moisture to plants during the brief period of commercial transport. For long term health, however, plants would need to be freed quickly from such a water-retentive environment.

U.S. Pat. No. 4,571,883 issued to Shaw on 25 Feb. 1986 describes a perforated cylindrical structure with a hemispherical top, which is limited to use with a corresponding dedicated planting container. Therefore this drain hole cover is not universally useful.

U.S. Pat. No. 4,860,491 issued to Panuski on 29 Aug. 1989 relates to a molded plastic disc with a plurality of arcuate openings and graduated standoffs. Its channels and openings are in direct fluid communication and therefore minimize erosion but do not prevent it. This drain hole cover is limited to use in planting containers with flat bottoms.

U.S. Pat. No. 5,448,854 issued to Hirsch, et al on 12 Sep. 1995 seeks to improve upon and simplify Shaw's complex device, but is still a somewhat complex molded plastic or ceramic configuration. Direct fluid communication between its passageways allows free drainage but does not protect completely against soil erosion.

The drain hole cover of U.S. Pat. No. 6,125,579 issued to Pavelka on 3 Oct. 2000 is limited to use in planting containers with elevated drain holes, and its inflexible molded plastic composition precludes its conformation to a variety of contours.

The planar device of U.S. Pat. No. 7,743,554 B2 issued 29 Jun. 2010 to Morris is elevated on three legs, and can only address drain holes located entirely on a container's lower horizontal surface. Its rigidity likewise renders it non-universal, since it may only be used in containers of a greater diameter than itself.

The above methods and devices offer no fully satisfactory answer to the need for an inexpensive, convenient, and universally useful drain hole cover for planting containers. The direct fluid communication common to the above methods and devices permit soil erosion to some extent during normal top watering and to a greater extent during bottom watering and soil drenching. Rigidity of material and particulars of configuration are limiting factors, and suggest looking to other more flexible materials to solve this problem. The following patents suggest such materials.

Brandell's U.S. Pat. No. 1,996,898 issued 9 Apr. 1935 presents a departure from rigid and solid materials. He specifies flexible, interstitial knitted metal mesh formed into a sleeve and folded in on itself to form a spongiform metal ball, which is placed over the drain hole in the base of the planting container. This allows water to drain freely and prevents the roots of the plant from clogging the drain hole, but is not stated to retain soil in the container. Furthermore, Brandell teaches no mechanism to keep the metal ball centered while the soil medium is being placed in the container. Most notably, depending on choice of metal, this device would possibly degrade in the constantly moist environment presented by a filled and watered planting container, either rusting or forming corrosive metal salts.

U.S. Pat. No. 3,675,368 issued to Nustad on 11 Jul. 1972 for a large rooftop planter box has a glass wool mat used primarily as insulation. This mat secondarily provides a drainage layer, presumably into which water can collect away from the planting medium, as no drain holes appear in the patent drawings. When handled, glass wool, often referred to as fiber glass, sheds tiny glass particles which are irritating to the skin. Therefore this would not be a material favored by consumers for drain hole cover application.

As a wire hanging planter basket may be considered a planting container with the spaces between the crossed wires constituting enlarged drainage voids, the following two patents are also considered prior art drain hole covers.

U.S. Pat. No. 3,958,365 issued to Proctor on 25 May 1976 specifies a loosely felted fibrous material consisting principally of coconut fiber to which a waterproof adhesive bonding substance has been applied, to be used primarily as a ground cover mat or soil cover. The biodegradability of the coconut fiber would eliminate this as an effective permanent drain hole cover solution.

The invention of U.S. Pat. No. 6,318,022 issued 20 Nov. 2001 to Just is a compressed sheet form of sphagnum moss which can be precut to fit planting containers in a variety of shapes. When moistened, the moss expands to its original natural thickness, and well retains soil within a basket's metal frame. While attractive in this application, sphagnum moss is well-known for its ongoing tendency to drop loose filaments. Also, such a biodegradable liner requires periodic replacement, a messy and inconvenient task.

Henson has submitted a patent application for a container lining, published as U.S. Patent Application Publication 2005/0060933 on 24 Mar. 2005. His invention is made from the fibers of the kenaf plant mixed with a binding agent. This liner could be used in either hanging baskets or pots, but like Proctor's, the base fiber would eventually biodegrade.

Materials described above will rust, irritate the skin or biodegrade, and still leave gardeners looking for a better alternative to cover their planting container drain holes. Man-made fibers present no such objections, however, and their compatibility with plant materials has been well established.

U.S. Pat. No. 3,866,352 issued to Herveling, et al on 18 Feb. 1975 is a pot liner made of a random nonwoven fiber mat of looped, intersecting and amorphous filaments of melt-spun polymers which are bonded together at their intersections. This bonding necessarily effects a rigidity and results in high cavity volume. As an improvement upon an earlier German utility patent which places the mat only at the bottom of a planting container, this version combines vertical and horizontal portions to line the interior bottom and sides of planting containers. The high cavity volume interstices of the vertical portion serve as pathways for evaporation of the excess water from the bottom of the container. Rather than being designed to cover a drain hole, this invention serves to compensate for the lack of one, none being shown in the patent drawings. Should this mat be applied over a drain hole, however, its rigidity and high cavity volume would allow direct fluid communication, resulting in soil erosion from the bottom of the container.

In contrast, U.S. Pat. No. 4,166,340 issued to Pluenneke on 4 Sep. 1979 employs a nonbiodegradable material and eliminates completely the rigidity and bonding of Schwartz and Herveling. Pluenneke employs the synthetic fiber fraction of discarded tires as an unbonded loose fill placed in the bottom of planting containers over the drain hole and beneath the soil. In his "Detailed Description of the Invention," he offers that this material is retrievable directly from a large tire reclaiming facility, suggesting that this material might be an attractive option to large wholesale growers, but likely not the preferred choice of the average home gardener. But whether used by large wholesale growers or home gardeners, the loose fill nature of this fraction makes its retrieval, collection, and reuse difficult upon disassembling of filled container plantings. Therefore, an increasing quantity of this foreign nonbiodegradable substance might find its way into the larger environment.

The following three patents, while employing the preferred synthetic fiber and improving upon the uncontained loose fill of Pluenneke, nevertheless share the limiting factors of an abrupt change in particle size, non-universal application, and resulting cost and inconvenience to the consumer.

U.S. Pat. No. 5,181,951 issued to Cosse, Jr. on 26 Jan. 1993 employs nonwoven synthetic fabric, unspecified as to loft, to encase a packet of gravel and fertilizer for disposition in bottom of a planting container. Its side skirt extends vertically upward and communicates with the inner side wall and therefore must be produced—and purchased—in a plurality of sizes to correspond to different sizes of planting containers. Its complex construction will impact cost, as will its need to be replaced periodically as the fertilizer component is exhausted. Cost issue aside, the encased gravel layer effects an abrupt change in particle size from the soil mass, and will actually impede drainage, as described previously in this section.

The drain hole cover of U.S. Pat. No. 6,606,821 issued to Connelly on 19 Aug. 2003 is constructed as Cosse's, but includes no fertilizer. It specifies the encased layer to be a plurality of rocks, gravel, or nonabsorbent beads or pellets. With the exception of the exhaustibility of the fertilizer component, this device presents objections identical to those of Cosse's.

U.S. Pat. No. 7,877,930 B2 issued on 1 Feb. 2011 to Burge repeats the pouch construction and large-particle fill of Cosse and Connelly, improved by the possible addition of hydrophilic particles and a pot hole locator. Cosse, Connelly and Burge all compromise drainage by an abrupt change in particle size, and do not present a universal and inexpensive solution. They fail to address drain holes located partially or entirely in the container's vertical side walls, and must be purchased in a particular size relative to the planting container at hand.

DETAILED DESCRIPTION

Embodiments of the present invention include a drain hole cover comprised of a nonwoven textile, of a preferred generally discoid shape, and of sufficient diameter to surpass and encompass that of well-known drainage holes in common planting containers. In one embodiment, the drain hole cover can have an adhesive applied to the periphery of a lower face or surface of the drain hole cover. In a preferred embodiment, the drain hole cover is disposed concentrically over the drainage hole of a planting container, such that the adhesive-free area of the drain hole cover coincides with the aperture of the drainage hole of the planting container. Filtering properties of the nonwoven textile allow water applied to the container and its contents to pass through the drainage hole, while the soil is held securely within the container.

Accordingly, several objects and advantages of the present drain hole cover include, but are not limited to, providing a drain hole cover (a) that is suitable for use in planting containers of all sizes, types, shapes, and materials; (b) that is inexpensive to manufacture and purchase; (c) which with ease may conform to and shield drainage holes differing in profile, position or curvature; (d) which will remain in position and last the life of the planting; (e) which will protect against the erosion of soil particles of all sizes during top watering, bottom watering, and pot drenching and soaking; (f) with a circuitous and irregular path of fluid communication; (g) which may be easily retrieved and perhaps reused when containerized plantings are dismantled; and (h) which discourages intrusion of insects through the drain hole into the planting medium. The drain hole cover can also encourage diversion of plastics from the waste stream, through the use of recycled material in the manufacture of such a drain hole cover.

As these objects indicate, the advantages of the present drain hole cover overcome the problems inherent in the prior art noted above.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment," "an embodiment," "another embodiment," "a preferred embodiment," "an alternative embodiment," "one variation," "a variation," and similar phrases mean that a particular feature, structure, or characteristic described in connection with the embodiment or variation, is included in at least an embodiment or variation of the invention. The phrase "in one embodiment," "in one variation," or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

A First Embodiment of a Drain Hole Cover for a Planting Container

FIGS. 1A-1E illustrate various aspects of a preferred embodiment 100 of the present invention. The embodiment 100 can be implemented in a planting container to allow for drainage of water through a drainage hole of the planting container.

Figure 1A:
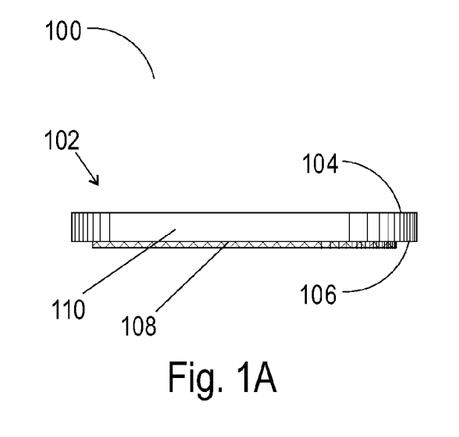
FIGS. 1A-1E are detailed diagrams of various views of a drain hole cover according to one embodiment of the present invention.

FIG. 1A is a side view of a discoid 102 resting in a horizontal position. The discoid 102 can be implemented as a drain hole cover for a planting container or planter. The drain hole cover 102 generally comprises a nonwoven textile of sufficient pore size to allow the passage of water through the cover. In a preferred embodiment, the drain hole cover 102 comprises a lofted nonwoven synthetic textile. It is to be appreciated that other types of nonwoven textiles may be implemented as well as other materials exhibiting the same properties as nonwoven textiles.

Generally, a lofted nonwoven fabric can be characterized by having at least 35% air by volume. For purposes of this specification, a "lofted" nonwoven textile has a fiber structure that contains 35% to 99% air by volume. Varying amounts of air by volume can define a low lofted, medium lofted and high lofted nonwoven textile. A low lofted nonwoven textile can be a nonwoven textile with 35% to 50% air by volume. A medium lofted nonwoven textile can be a nonwoven textile with 50% to 75% air by volume and a high lofted textile can be defined by a nonwoven textile having greater than 75% air by volume.

The compressible labyrinthine interstitial quality of lofted nonwoven textiles and low-density of the material allows for the passage of water. As such, the drain hole cover 102 is water permeable. In one embodiment, the drain hole cover 102 is manufactured such that water passes through the drain hole cover 102 but dirt and other particles do not. The drain hole cover 102 provides an effective, simple, inexpensive, flexible, and universally useful solution to the longstanding horticultural problem of drain hole coverage. The versatility of such textiles allows the drain hole cover 102 to vary in color, size, shape, thickness, density, and texture while still accomplishing the objects and advantages previously mentioned.

In one embodiment of the present invention, the drain hole cover 102 is made from a single layer or sheet of lofted nonwoven synthetic textile in a preferred generally discoid shape. The size of the cover 102 can be such that a perimeter of the cover 102 may exceed and encompass that of well-known drain holes in common planting containers. It is to be appreciated that the size of the drain hole cover 102 may be altered to fit existing drainage holes.

As shown in FIG. 1A, when resting horizontally, the drain hole cover 102 presents a top surface 104, a bottom surface 106, an adhesive 108, and a vertical side wall 110. In the horizontal position, the top surface 104 and the bottom surface 106 of the drain hole cover 102 are established. The adhesive 108 is located on the bottom surface 106 of the drain hole cover 102. It is to be appreciated that the surface of the drain hole cover 102 that interacts with the planting container can be considered the bottom surface 106. The vertical sidewall 110 is formed by, and equal to, a thickness of the textile sheet from which the drain hole cover 102 is cut or formed.

The adhesive 108 is implemented to adhere or attach the drain hole cover 102 to a planting container. In a preferred embodiment, the adhesive 108 is applied such that a substantial area of the drain hole cover 102 remains adhesive free. For instance, a generally central area is left adhesive free corresponding with an area of a drainage hole of the planting container.

Generally, the adhesive 108 is applied in a similar shape of the drain hole cover 102. For example, the adhesive 108 is applied in a continuous ring or circle around the periphery of the bottom surface 106 of the drain hole cover 102, as shown in FIGS. 1A-1E. In one instance, the diameter of the ring formed by an inner edge of the adhesive ring can be greater than the diameter of well-known drainage holes found in common planting containers. It is to be appreciated that the adhesive 108 can be applied in varying patterns to the drain hole cover 102.

In a preferred embodiment of the present invention, the adhesive 108 is a pressure-sensitive adhesive. In one example, the adhesive is a pressure-sensitive adhesive that is waterproof. It is to be appreciated that a variety of types of adhesives can be implemented with the present invention. An adhesive that is removably attachable and waterproof is preferred, but permanent adhesives that are waterproof can also be implemented.

Figure 1B:
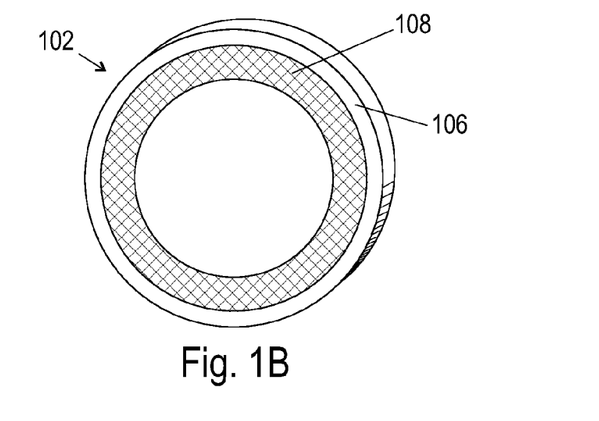

FIG. 1B shows a perspective view of the bottom surface 106 with the adhesive 108 applied as a ring around the periphery of the cover 102. In one embodiment, the adhesive 108 is a multiple application or reusable adhesive. By implementing a multiple application adhesive, the drain hole cover 102 can be adhered and removed several times during the life of the drain hole cover 102. For instance, the drain hole cover 102 can be moved from one planting container to another with the reusable adhesive.

Figure 1C:
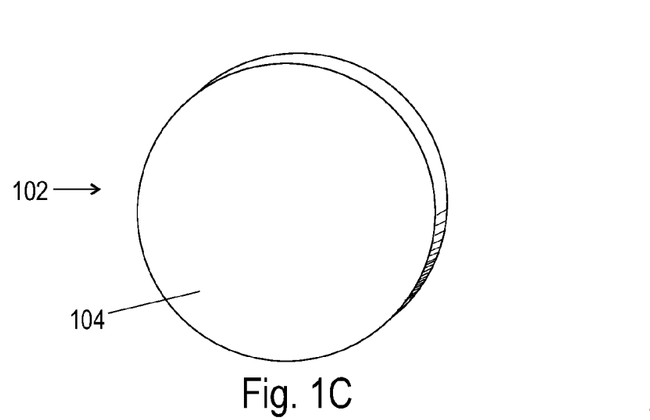

FIG. 1C shows a perspective view of the top surface 104 of the drain hole cover 102. As shown, the top surface 104 has a circular shape in one embodiment. It is to be appreciated that the shape of the cover 102 can be altered to meet a specific need. For instance, if a drainage hole of a particular planting container is rectangular, the cover 102 can also be rectangular in shape.

Figure 1D:
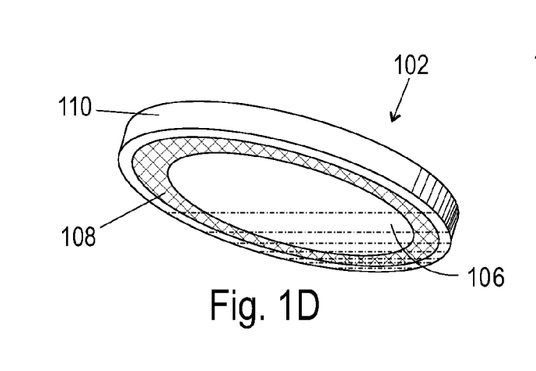

FIG. 1D shows the drain hole cover 102 raised at a slight angle above the horizontal, allowing the bottom surface 106 and adhesive 108 to be viewed from beneath.

Figure 1E:
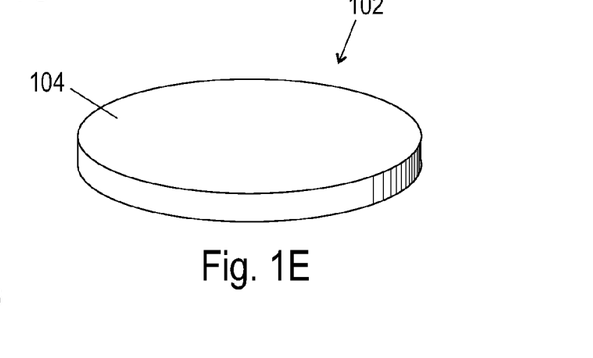

FIG. 1E is a perspective view of the drain hole cover 102 from above when the drain hole cover 102 is resting in a horizontal position. As shown in FIG. 1E, the cover 102 can have a thickness. It is to be appreciated that the thickness of the drain hole cover 102 can be altered depending on a particular implementation of the drain hole cover 102.

Figure 2:
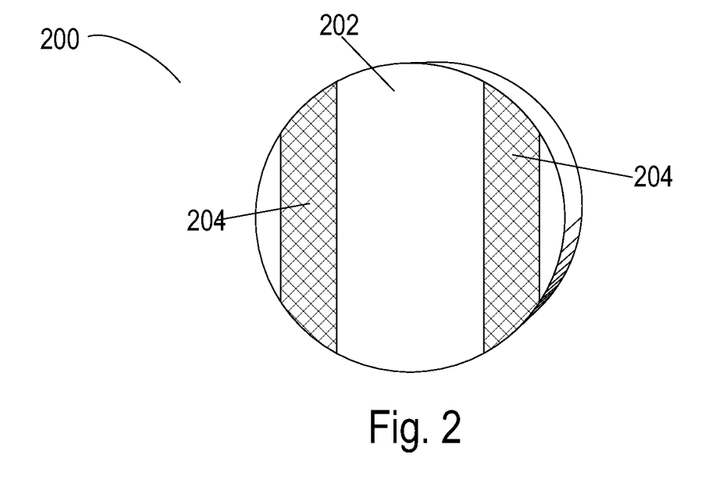
FIG. 2 is a detailed diagram of another drain hole cover according to one embodiment of the present invention.
Figure 3:
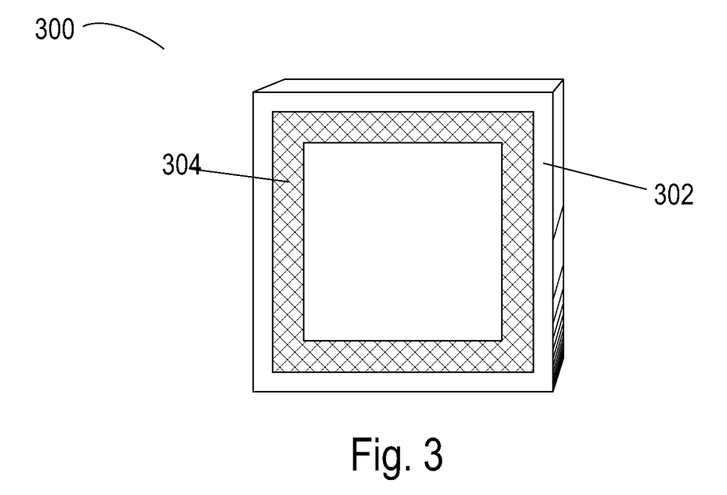
FIG. 3 is a detailed diagram of a square shaped drain hole cover according to one embodiment of the present invention.

FIG. 2 and FIG. 3 illustrate two examples of many possible alternative embodiments of the present invention.

FIG. 2 illustrates an embodiment 200. As shown in FIG. 2, a drain hole cover 202 retains the circular or discoidal shape of the preferred embodiment 100. In the present embodiment, an adhesive 204 is applied in two parallel strips to one side or a bottom surface of the drain hole cover 202. As shown in FIG. 2, the adhesive 204 is spaced so as to allow a central portion of the drain hole cover 202 to remain unobstructed from the adhesive coating. Depending on the size of a drain hole of a particular planting container, the adhesive 204 can be spaced appropriately on the bottom surface of the drain hole cover 202. In one embodiment, the adhesive 204 is a pressure-sensitive adhesive.

FIG. 3 illustrates an embodiment 300. As shown, a drain hole cover 302 has a square shape with an adhesive 304 applied to one side. In the present embodiment, the adhesive 304 is applied in a corresponding angular pattern on the bottom surface of the drain hole cover 302.

It is to be appreciated that a change in shape and/or adhesive pattern does not alter the functionality of the drain hole cover 102, the drain hole cover 202, or the drain hole cover 302. A variety of shapes and sizes can be implemented as long as a portion of the drain hole cover remains free from the adhesive coating. The ring of adhesive 104 around the periphery of the drain hole cover 102, the parallel strips of pressure-sensitive adhesive 204 illustrated in FIG. 2, the square shaped sheet of lofted nonwoven synthetic textile 302 illustrated in FIG. 3, and the correspondingly angular pattern of applied adhesive 304 shown in FIG. 3 illustrate some alternative embodiments of the present invention. The adhesive patterns illustrated in FIGS. 1-3 demonstrate that the adhesive can be applied in many patterns which provide a generally centered adhesive-free zone. Preferably the adhesive is applied such that the adhesive can accommodate and slightly exceed the diameter of well-known drainage holes in common planting containers.

The aforementioned examples should be understood as exemplary selections from a host of possible shapes and adhesive coating pattern configurations.

An Embodiment of an Apparatus having a Plurality of Drain Hole Covers

Figure 4A:
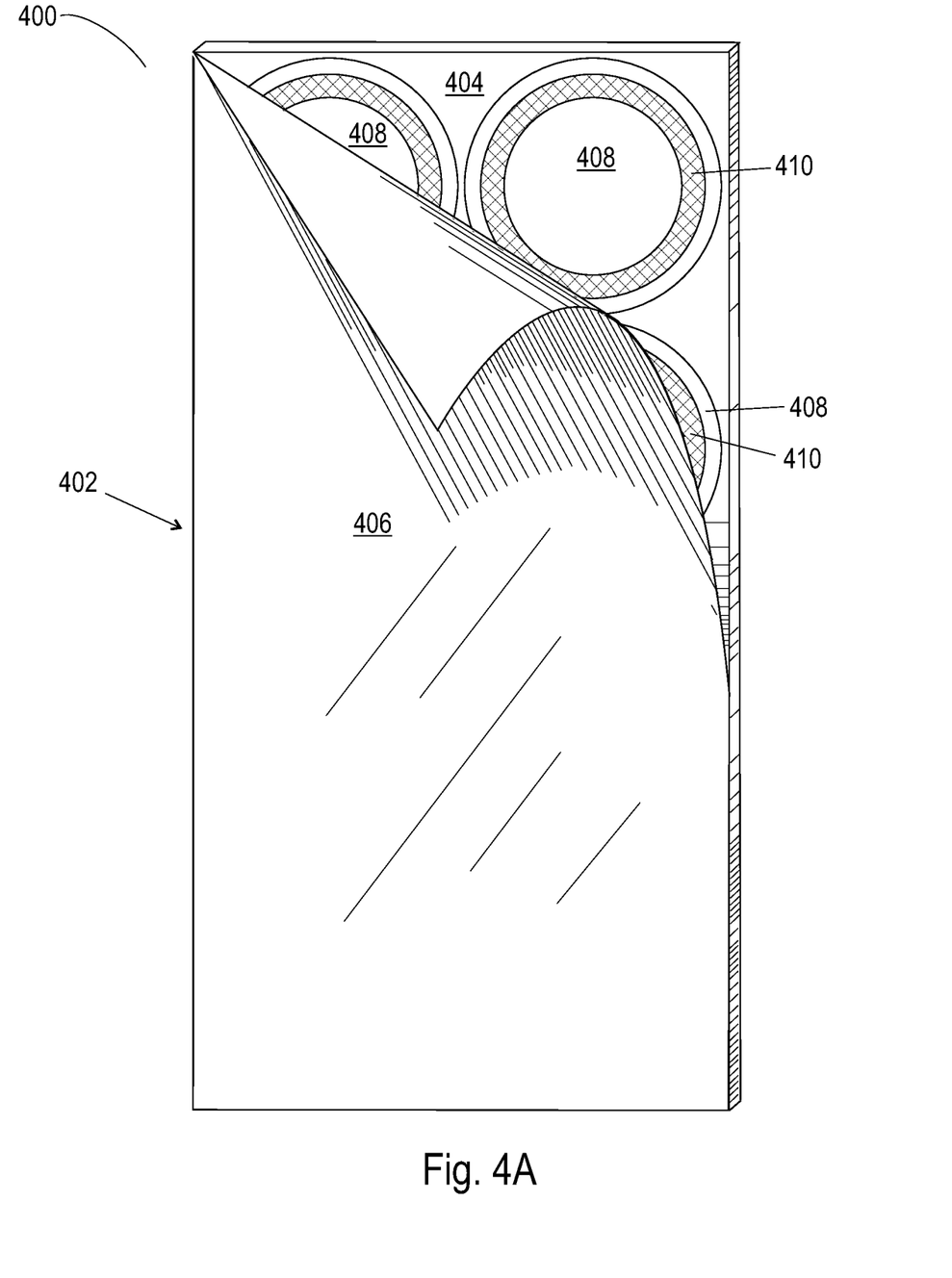
FIGS. 4A-4B are detailed diagrams of a packaging of drain hole covers according to one embodiment of the present invention.
Figure 4B:
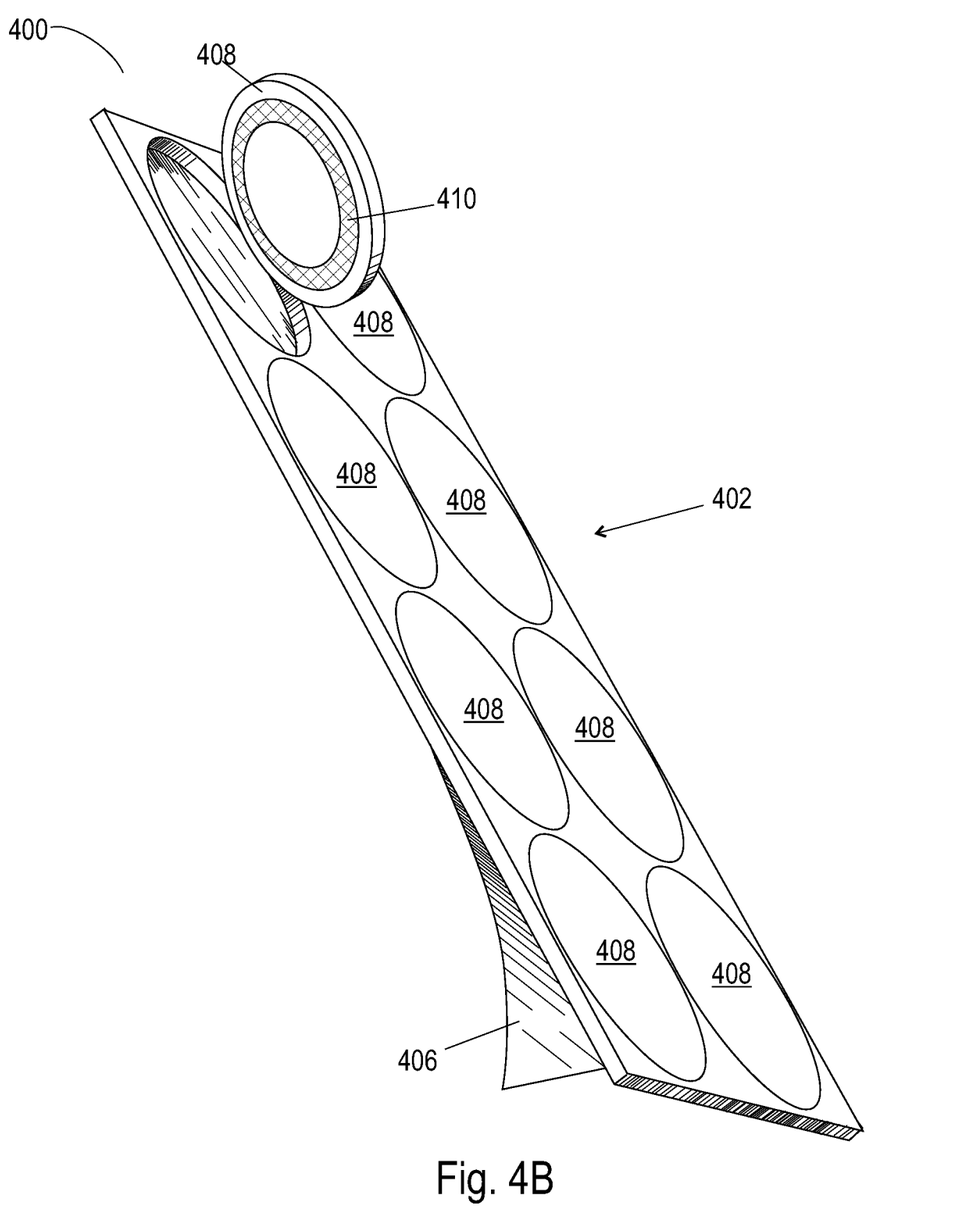

FIGS. 4A-4B illustrate an embodiment 400 showing an apparatus 402 used to present a user with a plurality of drain hole covers.

The apparatus 402 generally comprises a rectangular panel or sheet of lofted nonwoven synthetic textile 404 and a release paper 406. In one embodiment, the sheet of lofted nonwoven synthetic textile 404 is comprised of a plurality of drain hole covers 408 similar to the drain hole covers previously discussed. Each of the drain hole covers 408 have an adhesive 410 applied to one side. The release paper 406 is removably affixed to the sheet of lofted nonwoven synthetic textile 404 by means of the peripherally applied adhesive 410. After each of the plurality of drain hole covers 408 are removed, an apertured cutaway waste portion is left. It is to be appreciated that the cutaway waste portion can be removed during processing and prior to packaging of the drain hole covers 408.

Where two materials are coupled together forming two layers, kiss cutting can be implemented to cut one layer without cutting the other layer. Generally, kiss cutting involves cutting the top layer of a two layered object. In a preferred embodiment, kiss cutting is implemented to form the plurality of drain hole covers 408 of the apparatus 402. For instance, kiss cutting can be implemented to cut out the shape of the plurality of drain hole covers 408 from the sheet of nonwoven textile 404. By implementing kiss cutting, the sheet of nonwoven textile 404 and adhesive 410 can be cut, but the release paper 406 is not cut. It is to be appreciated that varying forms of kiss cutting can be implemented. For instance, laser kiss cutting can be implemented. In another instance, die kiss cutting can be implemented.

In an embodiment of the present invention, the sheet of lofted nonwoven synthetic textile 404 is kiss cut while attached to the release paper 406 via the adhesive 410. During kiss cutting, the shape of the drain hole covers 408 can be determined. For instance, the drain hole covers 408 can be cut in a circular shape as shown in FIG. 4A. It is to be appreciated that the drain hole covers 408 can be "kiss cut" into a variety of shapes.

FIG. 4A illustrates a typical embodiment of the present invention as provided to a user. The release paper 406 is shown peeled back to show the bottom of several of the plurality of drain hole covers 408. In one embodiment, the drain hole covers 408 are kiss-cut to form the illustrated sheet of lofted nonwoven synthetic textile 404. This description should be understood as a selected example from a number of possible presentation forms. It is to be appreciated that other means of cutting the drain hole covers 408 from the panel 404 can be implemented. For example, the drain hole covers 408 can be cut by a pair of scissors. In another example, the drain hole covers 408 can be formed by a die cutting process.

FIG. 4B illustrates a single unit of the plurality of drain hole covers 408 being peeled from the release paper 406, of the typical presentation form, just prior to application. The adhesive 410 remains attached to the drain hole cover when being removed from the release paper 406. After removing the drain hole cover from the sheet of nonwoven synthetic textile 404, the drain hole cover is ready to be implemented in a planting container.

Implementations of a Drain Hole Cover in Various Planting Containers

Figure 5A:
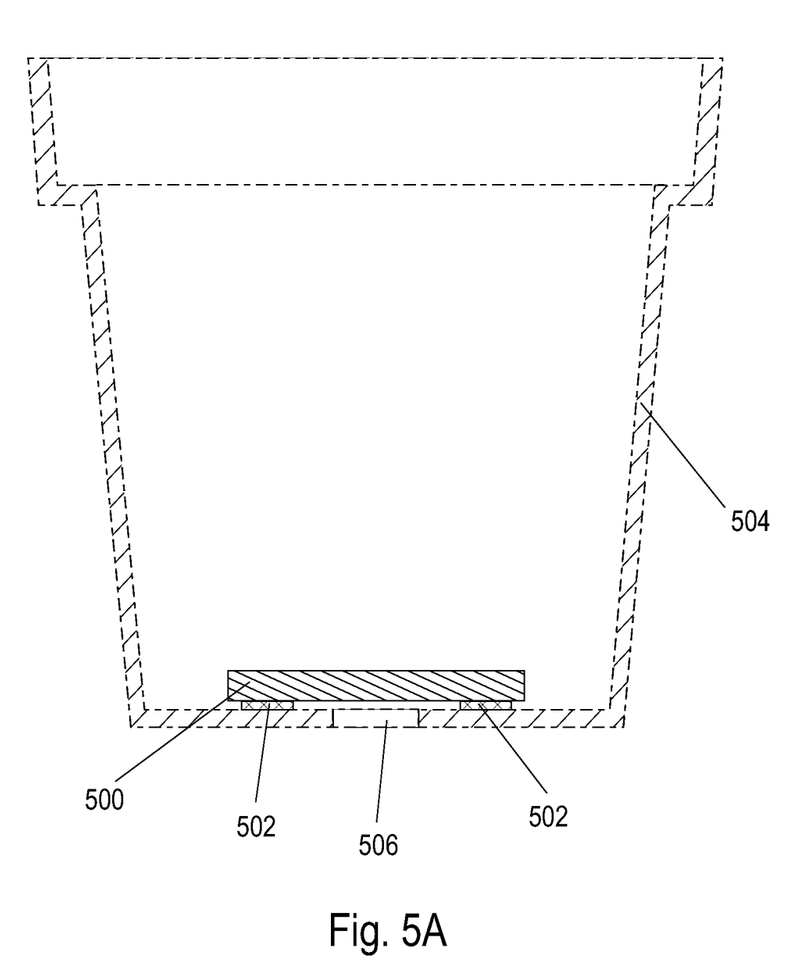
FIGS. 5A-5C are detailed diagrams of a drain hole cover implemented in a planting container according to one embodiment of the present invention.
Figure 5B:
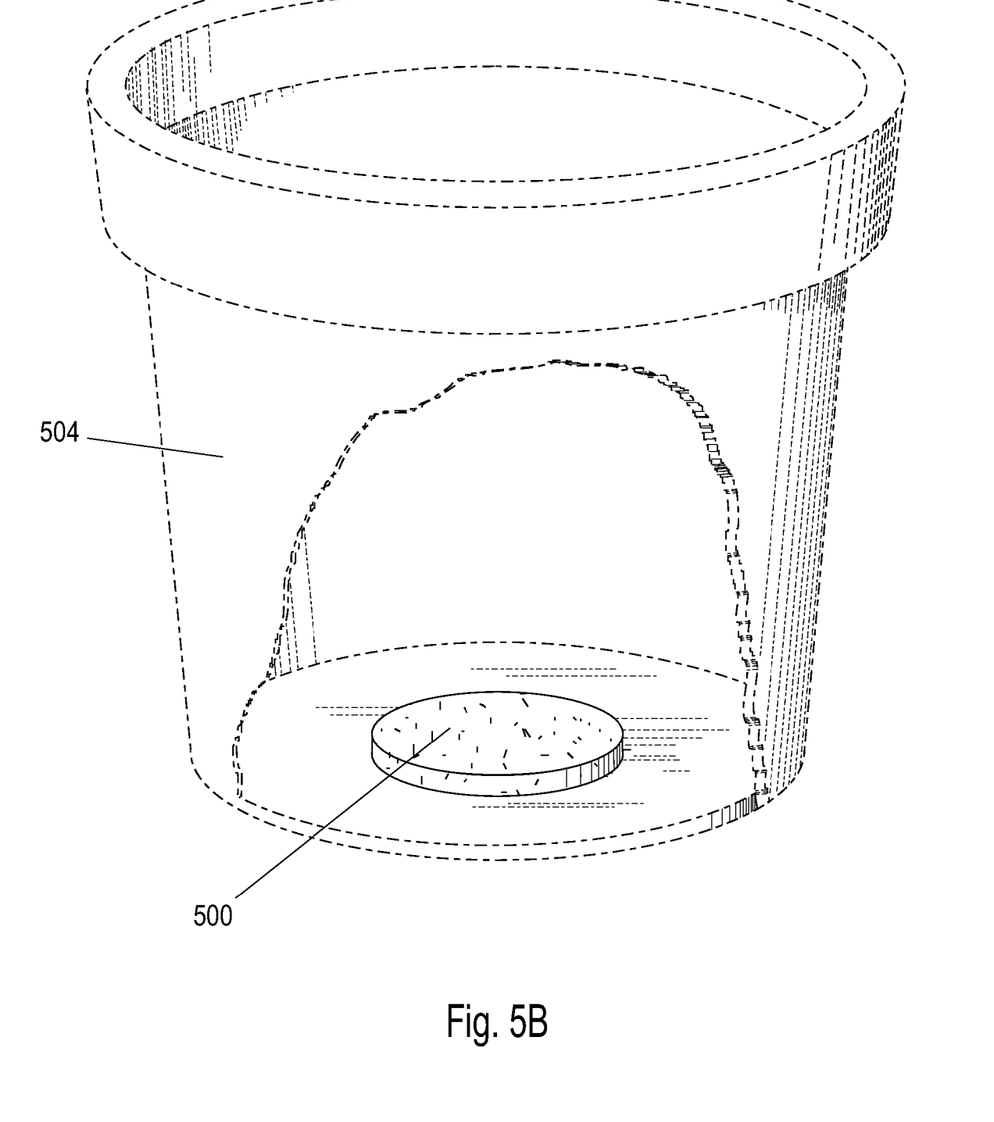
Figure 5C:
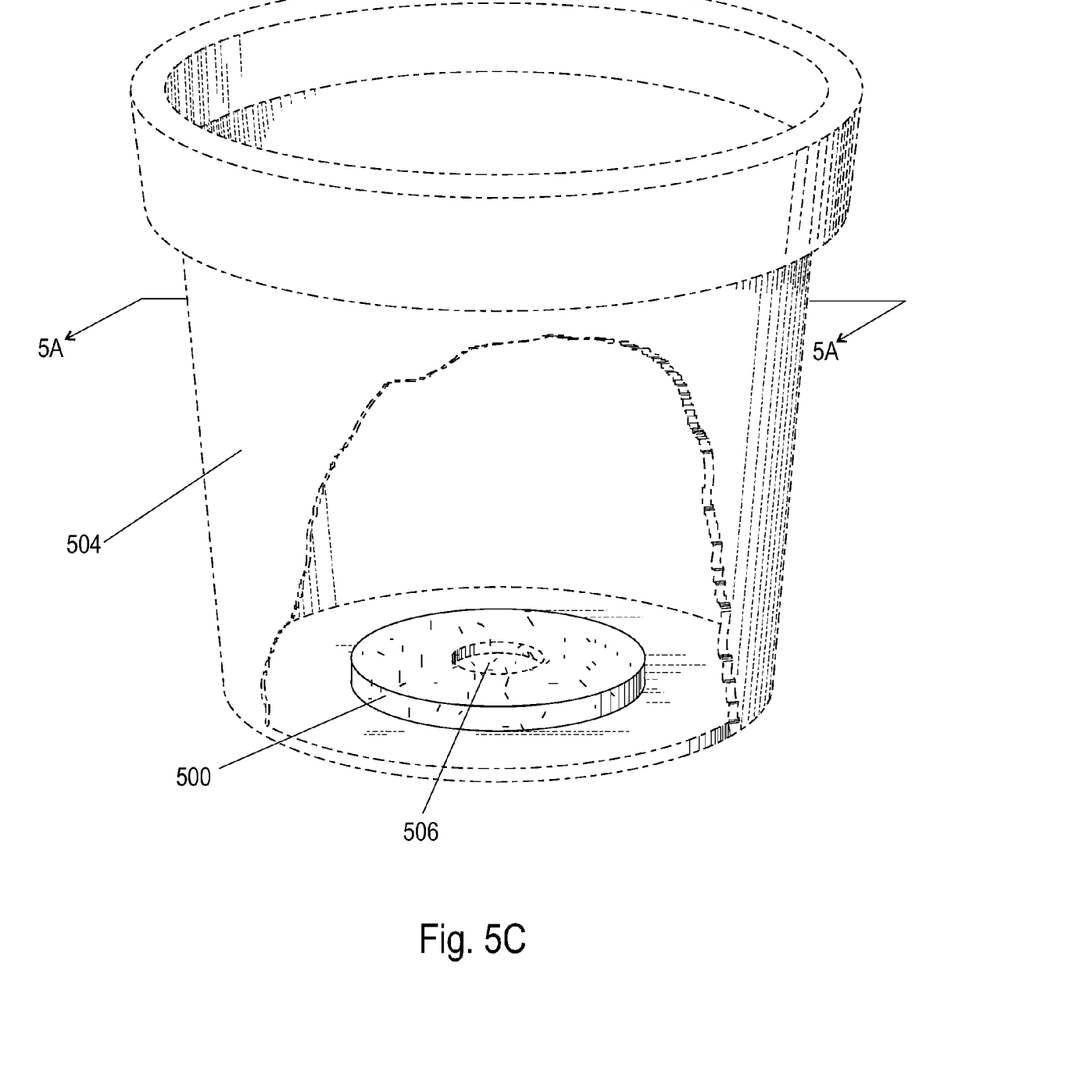

FIGS. 5A-5C illustrate a drain hole cover 500 being implemented in a planting container 504. The drain hole cover 500 has an adhesive 502 applied on one side. The planting container 504 is a typical container used in horticulture. As shown, the drain hole cover 500 can be disposed over a drainage hole 506 of the planting container 504.

FIG. 5A is a sectional view of the planting container 504. As shown, the drain hole cover 500 is disposed over the drainage hole 506 of the planting container 504. The drain hole cover 500 completely covers the drainage hole 506. The adhesive 502 is implemented to hold the drain hole cover 500 in place over the drainage hole 506.

FIG. 5B is a cutaway perspective view into the interior of the planting container 504. In one embodiment, the drain hole cover 500 is placed into position prior to the introduction of a planting medium into the container 504.

FIG. 5C is the same view as FIG. 5B, but with the addition of hidden lines to disclose the presence and location of the drainage hole 506 beneath the drain hole cover 500. FIG. 5C further denotes a sectioning plane for FIG. 5A.

Figure 6:
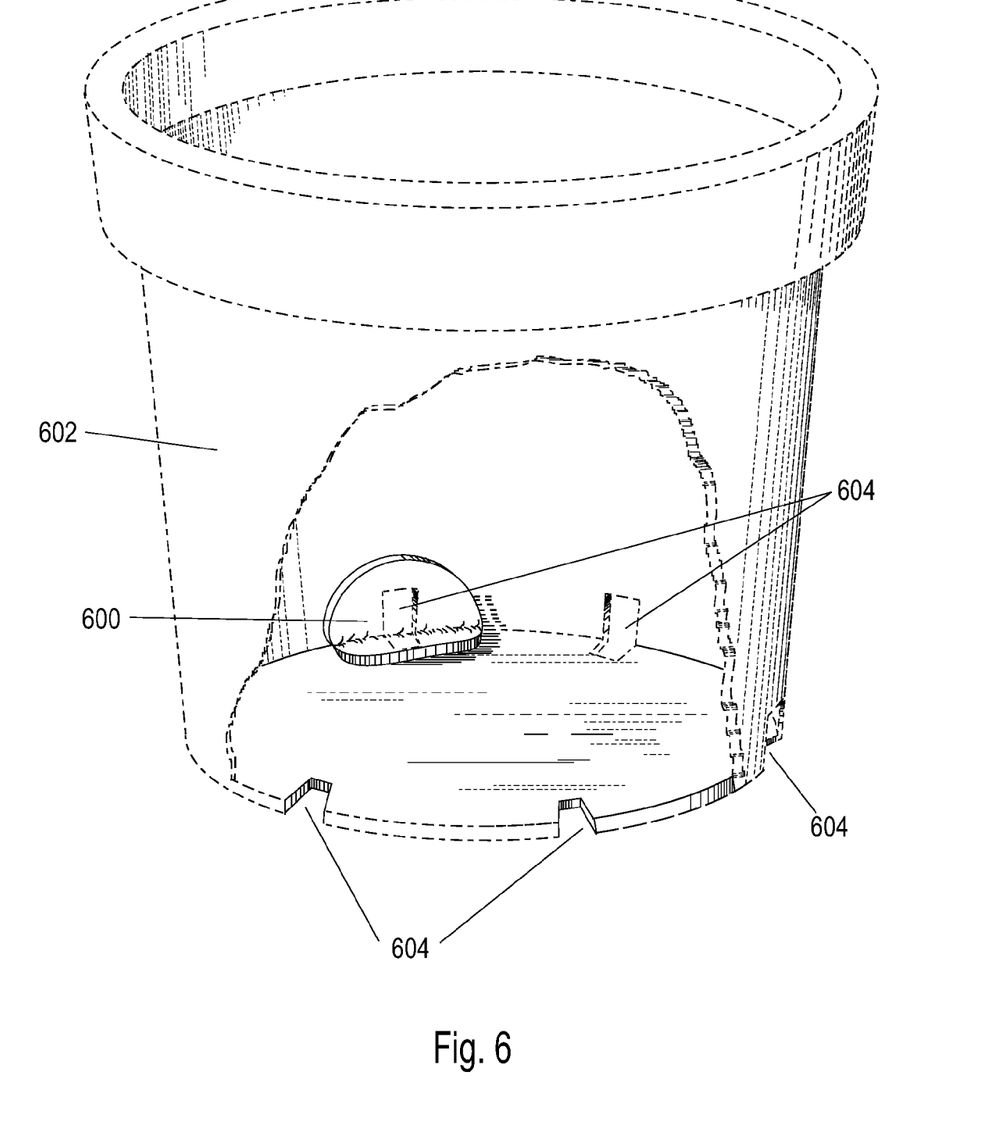
FIG. 6 is a detailed diagram of a drain hole cover implemented in a planting container having multiple drainage holes according to one embodiment of the present invention.

FIG. 6 is a cutaway perspective view into the interior of a planting container 602. A drain hole cover 600 and plurality of drainage holes 604 are shown in FIG. 6. The planting container 602 is one variation of a common planting container. As shown, the planting container 602 has an alternate drainage hole arrangement compared to the container 504 of FIG. 5. The plurality of drainage holes 604 are notched into an angle of intersection between a bottom of the container 602 and a side wall of the container 602. The drain hole cover 600 is shown flexed and fully seated into the interior of the angle into which the plurality of drain holes 604 are cut.

While a presently preferred embodiment of the invention has been described for purposes of this disclosure, other changes may be made which will readily suggest themselves to those skilled in the art. For example, the shape may be changed from generally discoid to any number of other shapes, symmetric or asymmetric. In addition, the preferred annular application pattern of the adhesive applied peripherally to the drain hole cover's underside may be altered to a linear or a grid formation, or any other pattern which allows a major central portion of its underside to remain free of adhesive. The operation and advantages of the invention would remain the same for any and all of its alternative embodiments.

These and other changes are well encompassed within the spirit of the invention disclosed and as defined in the appended claims.

A Method for Implementing a Drain Hole Cover for a Planting Container

Figure 7:
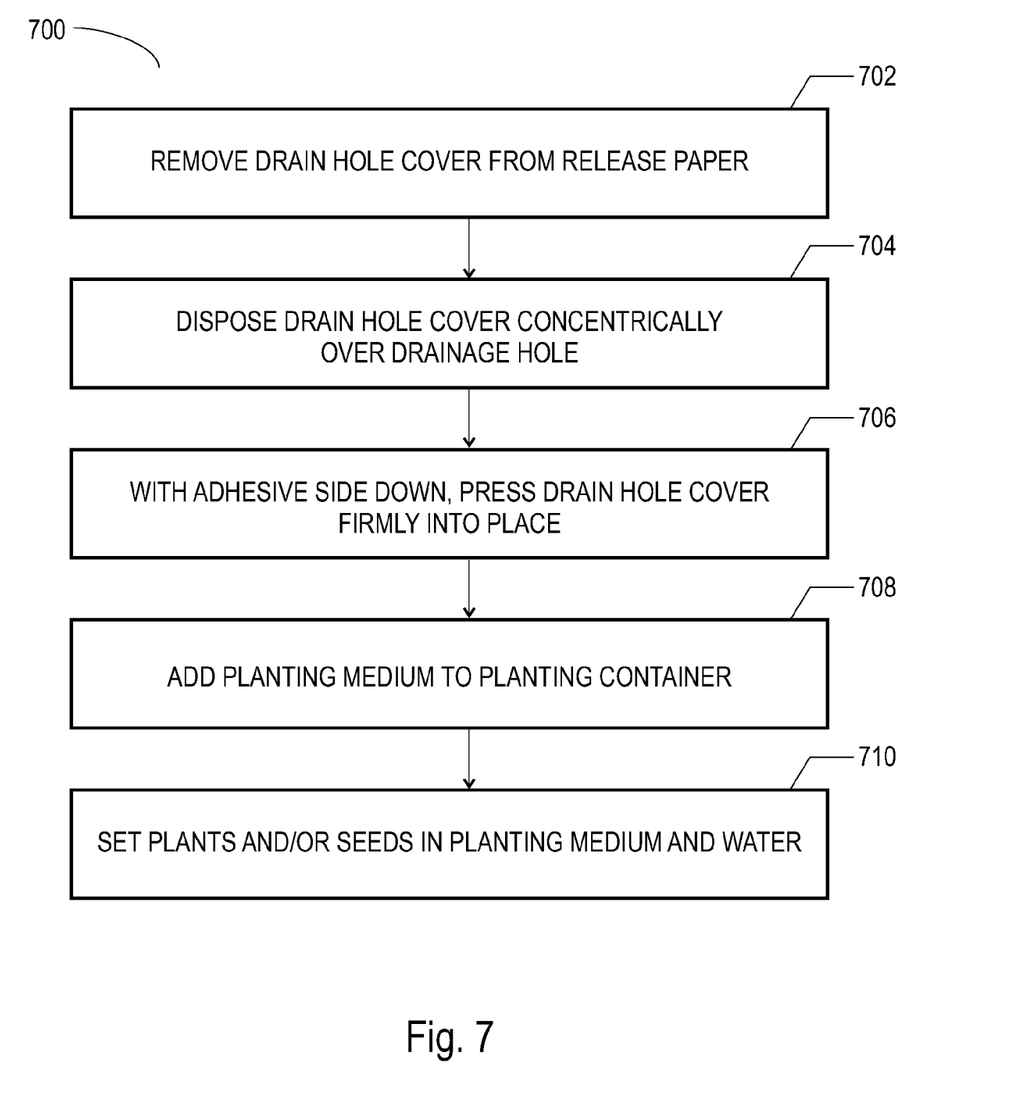
FIG. 7 is a flow chart depicting how to implement a preferred embodiment of the present invention.

FIG. 7 illustrates an embodiment 700 of a method for implementing a drain hole cover in a planting container.

A single drain hole cover is peeled from an attached release paper to expose a pressure-sensitive adhesive on an underside of the drain hole cover in block 702. With the adhesive side down and parallel to a plane of a drain hole in a planting container, the drain hole cover can be lowered into the empty container. The drain hole cover can then be disposed concentrically over the drain hole in block 704. In block 706, with the adhesive side down, the drain hole cover can be pressed firmly into place. The pressure-sensitive adhesive can then make contact with an interior surface of the planting container and anchor the drain hole cover in place. Being flexible, the drain hole cover can be conformed to the contours of a particular container by slight hand pressure. After the drain hole cover is firmly placed, planting medium can be added into the container without dislodging the drain hole cover in block 708. Seeds or plants can then be set into the planting medium in block 710, after which water is applied.

Water applied to the contents of the planting container may percolate downward through the planting medium and toward the drain hole. The filtering properties of the drain hole cover may allow water to pass freely through the drain hole and out of the container while the soil remains securely confined within the planting container. In addition, the synthetic composition of the textile and entangled construction render the textile a highly effective barrier to insects attempting entry through the drain hole.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. An apparatus comprising:
    a planting container having a drainage hole;
    a sheet of lofted nonwoven textile being at least 35% air by volume and water permeable, wherein the sheet of lofted nonwoven textile completely covers only the drainage hole of the planting container and an area immediately surrounding the drainage hole; and
    a waterproof adhesive applied to one side of the sheet of lofted nonwoven textile leaving a central portion of the one side adhesive free, the adhesive free central portion of the one side of the sheet of lofted nonwoven textile corresponding to an area of the drainage hole.

2. The apparatus of claim 1, the sheet of lofted nonwoven textile being synthetic.

3. The apparatus of claim 2, the sheet of lofted nonwoven textile having a discoidal shape.

4. The apparatus of claim 3, the waterproof adhesive being concentrically applied to the one side of the sheet of lofted nonwoven textile.

5. The apparatus of claim 1, the sheet of lofted nonwoven textile having a square shape.

6. The apparatus of claim 1, the sheet of lofted nonwoven textile comprising at least 51% air by volume.

7. The apparatus of claim 1, the waterproof adhesive being a pressure-sensitive adhesive.

8. The apparatus of claim 1, the waterproof adhesive being a permanent adhesive.

9. The apparatus of claim 1, the sheet of lofted nonwoven textile being elastic.

10. The apparatus of claim 9, the elastic sheet of lofted nonwoven textile conforming to a contour of the planting container approximate the drainage hole.

11. The apparatus of claim 1, the apparatus being one of a plurality of apparatuses formed by a method comprising:
    applying a layer of adhesive to a layer of nonwoven textile;
    attaching a release paper to the layer of nonwoven textile via the layer of adhesive; and
    kiss cutting the layer of nonwoven textile and layer of adhesive to form the plurality of apparatuses.

12. A system comprising:
    a planting container having a plurality of drainage holes;
    a plurality of sheets of elastic lofted nonwoven synthetic textile, each of the sheets of elastic lofted nonwoven synthetic textile configured to conform to a contour of the planting container; and
    an adhesive applied to one side of each of the plurality of sheets of elastic lofted nonwoven synthetic textile leaving a central portion of the one side of each of the plurality of sheets of elastic lofted nonwoven synthetic textile adhesive free, the adhesive free central portions corresponding to areas of the plurality of drainage holes, the plurality of sheets of elastic lofted nonwoven synthetic textile being removably attached to the planting container such that each of the plurality of drainage holes are completely covered by one of the plurality of sheets of elastic lofted nonwoven synthetic textile;
    wherein each of the plurality of sheets of elastic lofted nonwoven synthetic textile cover only one of the plurality of drainage holes and an area immediately surrounding the one of the plurality of drainage holes.

13. The system according to claim 12, each of the plurality of sheets of elastic lofted nonwoven synthetic textile having a discoidal shape.

14. The system according to claim 12, each of the plurality of sheets of elastic lofted nonwoven synthetic textile having a square shape.

15. The system according to claim 12, the adhesive being a pressure-sensitive adhesive.

16. The system according to claim 12, at least two of the plurality of sheets of elastic lofted nonwoven synthetic textile having a different shape.

17. The system according to claim 12, the adhesive being applied to a perimeter of the one side of each of the plurality of sheets of elastic lofted nonwoven synthetic textile, a portion of the one side being free of the adhesive.

18. The system according to claim 17, the adhesive free portion having an area approximate in size to an area of one of the plurality of drainage holes.

19. A combination comprising:
a planting container having a drainage hole;
an apparatus for use with the planting container, the apparatus comprising:
  a discoidal sheet of lofted nonwoven textile being at least 35% air by volume and water permeable, the discoidal sheet of lofted nonwoven textile defined by:
    a top surface;
    a bottom surface;
    a vertical side wall; and
    a perimeter that exceeds and encompasses the drainage hole;
  a reusable waterproof adhesive applied to the bottom surface of the discoidal sheet of lofted nonwoven textile leaving a central portion of the bottom surface adhesive free, the adhesive free area corresponding to an area of the drainage hole;
wherein the discoidal sheet of lofted nonwoven textile is disposed concentrically over the drainage hole covering only the drainage hole and an area immediately surrounding the drainage hole.

* * * * *